United States Patent Office 3,089,844
Patented May 14, 1963

3,089,844
METHOD OF ACTIVATING A FRESH, POROUS ALUMINA SUPPORTED PLATINUM-CONTAINING CATALYST
John P. Thorn, Elizabeth, and John A. Hinlicky, Irvington, N.J., assignors to Esso Research and Engineering Company, a corporation of Delaware
No Drawing. Filed May 14, 1953, Ser. No. 355,156
6 Claims. (Cl. 208—139)

The present invention relates to improvements in catalyst activation. More particularly, it relates to improvements in the activation and stability of platinum type catalysts.

For example, it is a matter of record and commercial practice to hydroform naphthas in the presence of a platinum catalyst. This platinum catalyst is usually supported on a suitable base, such as alumina, and may also contain a small amount of promoters or stabilizers such as boria, phosphoric anhydride, silica, or halogen acids. For instance, a commonly used composition of such catalyst is one containing from 0.01 to 2.0 weight percent platinum, the remainder being the alumina spacing agent or base. In place of alumina, other bases having mild cracking activity are used.

The platinum is impregnated on the alumina support by means known in the art. One of the better means involves treatment of the alumina support with aqueous solutions of water-soluble inorganic platinum-containing compounds. The term "water-soluble" also includes platinum-containing compounds which form colloidal solutions. Typical of the water-soluble inorganic platinum-containing compounds are chloro-platinic acid, potassium platinum chloride, platinum disulphide, tetraammino platino chloride, potassium platino-nitrite, dichloro diammino platinum, ammonium platino-nitrite, and dinitrito-diammino-platinum. A conveniently used aqueous platinum solution is one containing 15 grams of $H_2PhCl_6 \cdot xH_2O$ (40% Pt) per liter. This strength can be employed to yield catalysts containing about 0.5% platinum; lower or higher concentrations are employed when it is desired to alter the platinum content of the final catalyst, which will range from 0.01 to 5%, and more generally from about 0.1 to about 2%. The gross amount of solution utilized is that required to impregnate with the desired amount of platinum by just wetting the total alumina. The alumina support in the platinum solution is heated to dryness, conveniently at temperatures of about 250° F. at atmospheric pressure, which results in removal of a substantial portion of the water.

The final step in the preparation involves the subjection of the dried catalyst to a reduction step. This reducing step can be carried out by means known in the art, such as hydrogenation, calcination, and treatment with chemical reducing agents. Typical of these reduction operations is treatment with hydrogen at 200°–1000° F. with hydrogenation pressures of atmospheric to 1000 pounds p.s.i.g. Calcining can be carried out at temperatures of the order of about 1100° F., e.g., 800°–1200° F. Both types of operations are preferably carried out slowly, for example, over the course of about 4 to 24 hours.

In hydroforming operations, virgin naphthenic naphtha is contacted at elevated temperatures and pressures with the catalyst in the presence of added hydrogen. The function of the hydrogen is to repress the formation of carbonaceous deposits on the catalyst. The operating conditions of the hydroforming operation are pressures in the range of 50 to 1000 p.s.i.g., usually 200 to 700 p.s.i.g., and temperatures in the range of 700°–1100° F., usually 875°–950° F. The hydrogen dilution may vary from about 1000 to 10,000 c.f./b.

The feed or charging stock to the hydroforming reactor can be a virgin naphtha, a cracked naphtha, a Fischer-Tropsch naphtha or the like. The feed stock is preheated alone or in admixture with recycle gas to reaction temperature or to the maximum temperature possible while avoiding thermal degradation of the feed stock.

Because of the large quantities of the feed stocks that are processed in reactions such as hydroforming, a good deal of research has been expended in improving the activity of the supported platinum catalysts.

It has now been found that the activity of the supported platinum catalysts can be greatly improved by the process of this invention. The process comprises treating the supported catalyst with an oxidizing agent simultaneously, with a non-metallic halide. The thus treated catalyst is then dried and reduced, and is utilized in a catalyzed reaction system such as hydroforming.

The oxidizing treatment step can be carried out by means, such as with liquid oxidizing reagents, e.g., $HNO_3$. Metal-containing oxidizing reagents are not as desirable because of the possibility of introducing contamination. The temperatures utilized with liquid reagents vary approximately in the range of 68° F. to 200° F. at atmospheric pressure conveniently for about 1–20 hours. These temperatures can be varied as is understood in the art, i.e., utilizing higher temperatures at higher pressures. In utilizing a reagent like $HNO_3$, it has been found that 0.1 to 8 weight percent nitric acid based on the total catalyts and 50–500 weight percent water is suitable. It is preferred to employ a dilute solution which is about 0.01 molal to 2.5 molal $HNO_3$.

The inorganic halide that can be utilized includes preferably HCl.

An essential element of this activation procedure is that dilute aqueous solutions are used which do not materially dissolve the catalyst support. It is known to those skilled in the art that solutions of concentrated acids attack materials such as alumina to form soluble aluminum salts. The catalyst carrier is thus destroyed. In the treatment of this invention the "fresh" catalyst is contacted with "dilute" acid, i.e., about 1 to 30 weight percent of HCl based on the catalyst. This acid is contained in from 50 to 500 weight percent water based on the supported catalyst. These concentrations of acid do not dissolve the support appreciably. We thus prefer to use solutions which are from 0.1 molal to about 3 molal HCl.

The oxidation reagent and the inorganic halogen acid, may be added simultaneously so that oxidation and resolution by acid of the platinum proceeds in one step. An especially effective combination of oxidizing agent with hydrogen halogen acid is a combination of three weights of HCl to one of nitric acid in the indicated dilute aqueous solutions.

After addition of the HCl and $HNO_3$, the catalyst is contacted and heated at a temperature below that at which the HCl and $HNO_3$ are completely driven off. The pressures and temperatures and times are accordingly adjusted. Conveniently the heating is done up to a temperature of about 200° F. at atmospheric pressure. Excess water and acid are then removed from the catalyst, conveniently by elevating the temperature until the catalyst is dry.

The final step in the activation involves the subjection of the dried catalyst to a reduction step. This reducing step can be carried out by means known in the art, such as hydrogenation, calcination, and treatment with chemical reducing agents. Typical of these reduction operations is treatment with hydrogen at 400°–1000° F.

with hydrogenation pressures of atmospheric to 1000 pounds p.s.i.g. Calcining can be carried out at temperatures of the order of about 1100° F., e.g., 800°–1200° F. An advantage of the process of this invention is that the catalyst can be subjected to the reducing step directly in processes for which its use is contemplated, e.g., in hydroforming.

In some cases it may be desirable to minimize the amount of halide retained by the support. The halide can be removed by treating the catalyst by methods known in the art, such as by water washing, steaming, or treatment with ammonia. These washing steps conveniently can be carried out at any time after the halide contacting step. If the washing step takes place before the reduction step detailed above, it can be desirable to first convert the platinum to the insoluble sulfide. The reduction step would then follow in the same manner as taught above. Otherwise it is desirable to conduct the washing step after the reduction step. This washing can then be followed by another drying step.

The use of nitric acid is especially effective where metal contaminants are known to be present in the catalyst. The resulting soluble nitrates are removed by washing as taught above.

This invention will be better understood by reference to the following examples of the activation of a platinum catalyst.

*Example I*

A hydroforming catalyst was prepared by adding a solution of 12½ grams of chloroplatinic acid (containing 40% platinum) in 800 cc. of distilled water to 1000 grams of activated alumina (F–10, dried at 650° F.). The mixture was stirred and dried for about 8 hours at room temperature, followed by another drying period for about approximately the same interval at 250° F. The catalyst material was pilled and charged to a hydroforming unit where it was reduced with hydrogen while the temperature was raised to 900° F. The resultant catalyst was utilized in a hydroforming operation with a coastal virgin naphtha feed of 50 octane number and boiling in the range of about 200°–330° F. The hydroforming conditions were 200 p.s.i.g., 900° F., 6/1 hydrogen/hydrocarbon ratio at 2 w./hr./w. The clear research octane number of the hydroformate produced was 94.8. Hydroforming at 1 w./hr./w. gave a clear research octane number of 98.1. This represents the control figures.

A portion of the fresh catalyst prepared as indicated in the preceding paragraph was heated for one hour at 1100° F. to reduce and fix the catalyst by calcination in air in a similar manner as the control. This catalyst was then treated by a solution made by diluting 70 grams of hydrochloric acid plus 40 grams of nitric acid with 1200 cc. of water (7 weight percent hydrochloric acid plus 4 weight percent nitric acid on the base, 1.6 molal HCl, 0.5 molal HNO₃). The mixture was stirred and heated on a steam bath for one hour followed by drying at 650° F. overnight after a water washing step. The thus-treated catalyst was then utilized in a hydroforming operation wherein all the variables were the same as in the control. The research octane number at 2 w./hr./w. was 96.4 and at 1 w./hr./w. was 99.2. This is a significant improvement in octane number, especially when the quantities of hydroformates produced are considered.

The process of this invention is adapted to activate platinum catalysts on various types of supports. These supports include alumina or alumina containing silica, boria, zinc oxide, zirconia, titania, and thoria. The support can also be composed entirely of other materials or combinations of materials, such as zirconia, titania, magnesia, silica, or activated carbon and the like.

The activated platinum type catalysts of this invention are adapted for use in hydroforming, hydrogenation, and other reactions known to those in the art.

The amount of catalyst support dissolved is a function of time and concentration of acids, i.e., HCl and HNO₃. The utilization of more concentrated acids than listed in this invention results in relatively rapid support solution and makes the process difficult to control. The phrase "without materially dissolving" used herein refers to preferable maximum dissolving of the support of about 20 weight percent and preferably no more than about 5 to 10 weight percent.

The advantages of the process of this invention are apparent. Increased activity is obtained at minimal cost.

Another advantage is that the activation process of this invention, because of its flexibility of operation, can be incorporated directly into some of the operations for which the catalysts are utilized. Other advantages will be apparent to those skilled in the art.

It is to be understood that this invention is not limited to the specific examples, which have been offered merely as illustrations, and that modifications may be made without departing from the spirit of the invention.

What is claimed is:

1. The method of activating for hydroforming a fresh, porous alumina supported platinum-containing catalyst, which comprises the steps of treating the supported catalyst with a dilute aqueous mixture of nitric acid and hydrogen halide acid, said acid mixture being from 0.01 to 2.5 molal in nitric acid and from 0.1 to about 3 molal in hydrogen halide acid, without materially dissolving said support, drying the thus treated catalyst and reducing the treated catalyst.

2. The process of claim 1 in which the amount of nitric acid used is from 0.1 to 8.0 wt. percent based on the total catalyst.

3. The process of claim 1 in which hydrochloric acid is the hydrogen halide acid and the amount thereof used is from 1 to 30 weight percent based on the total catalyst.

4. The process of claim 1 in which the catalyst is calcined in air at about 800–1200° F. prior to treatment with the dilute aqueous acid mixture.

5. A freshly prepared activated, porous alumina supported platinum containing catalysts activated by treating the supported catalyst with a dilute aqueous mixture of nitric acid and hydrogen halide acid, said acid mixture being from 0.01 to 2.5 molal in nitric acid and from 0.1 to about 3 molal in hydrogen halide acid, without materially dissolving said support, drying the thus treated catalyst and reducing the treated catalyst.

6. The process for catalytically hydroforming of hydrocarbons boiling in the naphtha boiling range which comprises contacting naphtha vapors in admixture with hydrogen at temperatures of about 875–950° F. and at pressures of from 50 to 1000 p.s.i.g. with a fresly prepared activated, porous alumina supported platinum containing catalysts activated by treating the supported catalyst with a dilute aqueous mixture of nitric acid and hydrogen halide acid, said acid mixture being from 0.01 to 2.5 molal in nitric acid and from 0.1 to about 3 molal in hydrogen halide acid, without materially dissolving said support, drying the thus treated catalyst and reducing the treated catalyst.

References Cited in the file of this patent

UNITED STATES PATENTS

| | | |
|---|---|---|
| 1,952,911 | De Rewal | Mar. 27, 1934 |
| 2,344,208 | Kirkpatrick | Mar. 14, 1944 |
| 2,479,110 | Haensel | Aug. 16, 1949 |
| 2,635,080 | Appell | Apr. 14, 1953 |
| 2,641,582 | Haensel | June 9, 1953 |
| 2,642,384 | Cox | June 16, 1953 |
| 2,662,861 | Riblett et al. | Dec. 15, 1953 |
| 2,704,281 | Appell | Mar. 15, 1955 |

OTHER REFERENCES

Mellor's Modern Inorganic Chemistry, 1951, rev. ed. Parkes Longmans, Green and Co., New York, page 419.